3,193,987
MERCURY VAPOR REMOVAL
Milton Manes, Pittsburgh, and Richard J. Grant, McKees Rocks, Pa., assignors to Pittsburgh Activated Carbon Company, a corporation of Pennsylvania
No Drawing. Filed Feb. 23, 1962, Ser. No. 175,348
8 Claims. (Cl. 55—72)

This invention relates to the removal of mercury vapor from gases.

Mercury vapor is introduced into various gases such as air, hydrogen and carbon dioxide in various ways. A common source of mercury vapor is the mercury electrolytic cell used in electrolysis reactions, e.g., in the formation of hydrogen gas. The hydrogen gas formed is frequently used in the hydrogenation of fats and oils in the production of foodstuffs. Since even small amounts of mercury are poisonous it is important to remove the mercury from the hydrogen gas.

It is an object of the present invention to remove mercury vapor from gases.

Another object is the purification of hydrogen, air and carbon dioxide.

A further object is to clean mercury vapor out of food grade hydrogen.

Yet another object is to recover the mercury removed from the gas.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Activated carbon by itself has been found to be unsatisfactory for removing mercury vapor from gases such as hydrogen, air, carbon dioxide, oxygen and nitrogen since it has a low attraction for mercury and is a poor adsorbent at atmospheric and other relatively low temperatures in spite of its high surface area.

Many materials have been proposed in the past for removal of mercury vapor from gases. One of the best is silver. However when silver is employed by itself large amounts are required to obtain significant removal of the mercury.

It has now been found that the objects of the present invention can be attained by impregnating materials which dissolve mercury on activated carbon. It has been found that these products will rapidly and in many cases quantitatively remove mercury vapor from gases including hydrogen, air, carbon dioxide, nitrogen and oxygen. The high surface area of the activated carbon which is impregnated with the mercury reactant appears to be in part responsible for the greatly improved adsorption of the mercury vapor and the carbon appears to activate the metal or other material which dissolves the mercury.

The action of activated carbon appears to be specific. Thus when silica gel is employed in place of activated carbon as the support for the mercury solvent it is not possible to get a satisfactory coating. Additionally, the silica gel readily picks up waer vapor which is undesirable.

As the material employed to impregnate the activated carbon there can be used metals which will amalgamate with mercury. Examples of such metals are gold, silver, cadmium, indium, thallium, aluminum, lead, gallium and copper. Metals which are not easily oxidized such as the noble metals are preferred and silver is especially preferred metal and copper is one of the poorer materials.

The metal can be formed on the activated carbon by impregnating the carbon with a solution of a reducible salt of the metal, e.g., aqueous silver nitrate, auric chloride or cupric chloride, and then reducing the salt to the free metal in any conventional manner.

After the mercury has been adsorbed on the impregnated carbon it can be regenerated by heating. Thus 100% regeneration of activated carbon impregnated with silver, for example, can be obtained by heating to around 300° C. The mercury is recovered in pure form by this regeneration, e.g., by distillation.

Silver impregnated activated carbon picked up mercury from contaminated air in an amount of over 3% by weight of the carbon. This was 100 times as much mercury as was picked up by the unimpregnated activated carbon. Usually 5–50% of the impregnant is used with the activated carbon.

The granular activated carbon employed generally has a particle size between 4 and 60 mesh although this can be varied. In the specific examples there was emloyed Pittsburgh type carbon BPL which can be made as described in Zabor Patent No. 2,763,580. There can also be used other activated carbons such as Pittsburgh type CAL, Columbia activated carbon Grade SXAC, Darco activated carbons, etc.

Unless otherwise indicated all parts and percentages are by weight.

*Example 1*

Activated carbon (BPL) in a beaker was impregnated with an aqueous solution containing 100 grams per liter of silver nitrate and then the water evaporated and the product heated to a high temperature to convert the silver nitrate to metallic silver. The product contained 20% silver by weight of the activated carbon.

A 10 gram sample of the product was placed in a U tube and air saturated with mercury at room temperature was passed through the sample at a rate of 100 cc./min. The effluent air was checked for mercury vapor with a modified mercury vapor meter used in safety testing. There was no mercury breakthrough after over 400 hours in this test. The mercury was thus rapidly and quantitatively adsorbed. By heating the silver-activated carbon containing mercury it was possible to regenerate the silver-activated carbon and recover pure mercury.

In a similar test using unimpregnated activated carbon (BPL) there was a breakthrough of mercury vapor in less than 24 hours.

*Example 2*

Copper impregnated activated carbon was used with mercury vapor saturated air in the manner described in Example 1. After 100 hours the copper began to show mercury breakthrough.

In place of air hydrogen containing mercury can be used in Example 1 or 2.

The preferred materials according to the invention can be used in an amount of 1 ounce to 1000 cu. ft. of gas saturated with mercury vapor. The adsorbent can be used until it is loaded with mercury. This usually occurs at about 3% of mercury. Of course the adsorbent can be regenerated after it has picked up lower amounts of mercury, e.g. 2%.

While the impregnated activated carbon can be regenerated as stated above, it is also within the scope of the invention to utilize the purification agent on a one shot or thrown away basis. This is particularly true when using carbon which has been impregnated with one of the less expensive materials such as copper.

The mercury preferably is removed from the gas at atmospheric temperature although higher and lower temperatures can be employed. Of course the temperature should not be so high that the mercury will be released from the impregnated activated carbon.

What is claimed is:

1. A process of removing mercury from a gas contaminated with the same comprising passing the gas over activated carbon impregnated with a metal which forms an amalgam with mercury.

2. A process according to claim 1 wherein the gas is selected from the group consisting of air, hydrogen, carbon dioxide, nitrogen and oxygen.

3. A process according to claim 2 wherein the metal is a noble metal.

4. A process according to claim 2 wherein the metal is copper.

5. A process of removing mercury from a gas contaminated with the same comprising passing the gas over activated carbon impregnated with silver.

6. A process according to claim 5 wherein the gas is selected from the group consisting of air, hydrogen, carbon dioxide, nitrogen and oxygen.

7. A process of regenerating activated carbon impregnated with amalgum comprising heating the activated carbon to a temperature sufficiently high to release the mercury.

8. A process according to claim 7 wherein the amalgam is silver amalgam.

References Cited by the Examiner

UNITED STATES PATENTS

| | | | |
|---|---|---|---|
| 1,784,536 | 12/30 | Pantenburg | 55—79 |
| 2,511,288 | 6/50 | Morrell et al. | 252—447 |
| 2,511,289 | 6/50 | Morrell et al. | 252—438 |
| 2,511,290 | 6/50 | Morrell et al. | 252—447 |
| 2,513,508 | 7/50 | Morrell et al. | 252—438 |
| 2,773,844 | 12/56 | Carlson et al. | 252—447 |
| 2,847,332 | 8/58 | Ramadanoff | 117—169 |

OTHER REFERENCES

"Metals and Metallic Compounds" (Evans), published by Longmans, Green, and Co. (New York), 1923, vol. IV (pages 173–175 relied on).

German aplication 1,075,953 (KL. 61b 1/02), printed Feb. 18, 1957.

REUBEN FRIEDMAN, *Primary Examiner.*

HARRY B. THORNTON, *Examiner.*